United States Patent
Chen et al.

(10) Patent No.: US 12,339,823 B2
(45) Date of Patent: Jun. 24, 2025

(54) DATA STORAGE DEVICE AND STORAGE CONTROL METHOD BASED ON LOG-STRUCTURED MERGE TREE

(71) Applicants: HoneycombData Inc., Santa Clara, CA (US); HoneycombData (Nantong) Limited, Nantong (CN)

(72) Inventors: Yilun Chen, Beijing (CN); Meng Wang, Santa Clara, CA (US); Haibo Wu, Nantong (CN); Yu Zhang, Santa Clara, CA (US); Yunxiang Zhang, Nantong (CN); Xiangyong Ouyang, Santa Clara, CA (US)

(73) Assignees: HONEYCOMBDATA INC., Santa Clara, CA (US); HONEYCOMBDATA (NANTONG) LIMITED, Nantong (CN)

( * ) Notice: Subject to any disclaimer, the term of this patent is extended or adjusted under 35 U.S.C. 154(b) by 134 days.

(21) Appl. No.: 18/129,846

(22) Filed: Apr. 1, 2023

(65) Prior Publication Data
US 2024/0220470 A1    Jul. 4, 2024

(30) Foreign Application Priority Data
Dec. 30, 2022    (CN) .......................... 202211722337.4

(51) Int. Cl.
*G06F 16/00* (2019.01)
*G06F 16/22* (2019.01)
*G06F 16/245* (2019.01)

(52) U.S. Cl.
CPC .... *G06F 16/2246* (2019.01); *G06F 16/24569* (2019.01)

(58) Field of Classification Search
None
See application file for complete search history.

(56) References Cited

U.S. PATENT DOCUMENTS 10,496,283 B2 * 12/2019 Waghulde ............. G06F 3/0656
10,740,300 B1 *  8/2020 Lakshman ........ G06F 16/24573
(Continued)

FOREIGN PATENT DOCUMENTS

CN      104115146 A  * 10/2014  ......... G06F 17/3033
CN      114281775 A  *  4/2022  ........... G06F 16/174

OTHER PUBLICATIONS

ILSM-SSD: AN intelligent LSM-tree based key-value SSD for data analytics, Chang et al., IEEE (Year: 2019).*
(Continued)

*Primary Examiner* — Jean M Corrielus
(74) *Attorney, Agent, or Firm* — Treasure IP Group, LLC

(57) ABSTRACT

The present disclosure relates to a data storage device and a storage control method based on a log-structured merge tree. The log-structured merge tree comprises a plurality of SST files stored on at least one storage medium. The storage control method comprises: using a first filter to obtain the SST file set matched by the query key; using a second filter to globally sort the matching tags in the SST file set to generate a global tag set; the global tag set selects SST files to perform file IO operations to read key-value pairs. The storage control method selects the SST file to perform file IO operations according to the global tag set, thereby reducing the number of file IO operations in data reading operations, further improving file IO efficiency.

17 Claims, 6 Drawing Sheets

(56) References Cited

U.S. PATENT DOCUMENTS

| | | | |
|---|---|---|---|
| 2013/0159251 A1* | 6/2013 | Skrenta | G06F 16/2282 |
| | | | 707/612 |
| 2020/0192590 A1* | 6/2020 | Kurichiyath | G06F 3/0679 |
| 2020/0333968 A1* | 10/2020 | Bortnikov | G06F 16/9024 |
| 2022/0335027 A1* | 10/2022 | Subramanian Seshadri | |
| | | | G06F 16/24573 |
| 2022/0335028 A1* | 10/2022 | Xue | G06F 16/2246 |
| 2022/0342888 A1* | 10/2022 | Chekuri | G06F 9/45558 |

OTHER PUBLICATIONS

Efficient key-value stores with ranged log-structured Merge Tree, Nae et al., (Year: 2018).*

Less is more: De-amplifying I/O's for key value stores with a log assisted LSM-tree. Kecheng et al., (Year: 2021).*

* cited by examiner

SST File

Data Blocks

Meta Blocks                     Meta Index Block

SST File

Data Segment

Meta Segment

Page Index

Tags

10

DATA STORAGE DEVICE AND STORAGE CONTROL METHOD BASED ON LOG-STRUCTURED MERGE TREE

CROSS-REFERENCE TO RELATED APPLICATION

The present application claims priority to a Chinese Patent Application No. 202211722337.4, entitled "Data storage device and storage control method based on log-structured merge tree", filed on Dec. 30, 2022, the entire contents of which is incorporated herein by reference in its entirety.

TECHNICAL FIELD

The present disclosure relates to the technical field of data storage, and more specifically, to a data storage device and a storage control method based on a log-structured merge tree.

BACKGROUND

Solid State Drive (SSD) is a type of storage device made of solid-state memory chips, and mainly comprises controllers, storage media, and cache chips. At present, most mainstream Solid State Drives use flash memory, i.e., non-volatile memory such as NAND flash memory, as the storage medium to store data.

With the rapid improvement of SSD performance, SSDs have also been widely used in storage servers in the past few years. On a storage server using SSDs, the read and write latency for 4 KB pages can be less than 10 microseconds. However, existing key-value storage engines, such as RocksDB, perform file I/O synchronously to read key-value pairs. The calling thread must wait for the file I/O to complete, triggering a context-switch in the operating system. Compared with the low latency of SSD, the context switch of the operating system takes non-neglectable time, thus degrading the storage performance.

In the SSD of the storage server, data files are used to store massive amounts of data. For example, a Sorted String Table is a data file used to store key-value pairs. In order to meet the demand for high-density storage, a large number of SSDs are installed on the storage server, and each SSD can provide more than 1 million IOPS.

For a single data query request, the search result may exist in a plurality of SST files on a plurality of SSDs. If the search result exists in multiple SST files, the existing data query operation needs to perform file IO operations on multiple SST files to read all matching key-value pairs to form a result set, and then perform an exact match on the result set to identify a final search result. Therefore, this storage control method needs to spend a lot of time to perform file IO operations on multiple SST files, which has become a major bottleneck affecting the read and write speed of storage servers.

SUMMARY OF THE INVENTION

In view of the problems referred to above, the object of the present disclosure is to provide a data storage device and a storage control method based on log-structured merging tree, wherein, according to the global tag set, select the SST file to perform the file IO operation, thus it can be used in the data read operation to reduce the number of file IO operations, thereby improving file IO efficiency.

According to a first aspect of the present disclosure, a storage control method based on a log-structured merge tree is provided, the log structured merge tree includes a plurality of SST files stored on at least one storage medium, and the storage control method comprises: in the data segment of the plurality of SST files, using standardized storage units to store a plurality of key-value pairs; in the metadata segment of the plurality of SST files, establishing a first filter and a second filter; using the first filter to obtain the SST file set matched by the query key; using the second filter to globally sort the matching tags in the SST file set to generate a global tag set; select SST file according to the global tag set to perform file IO operations to read key-value pairs.

Preferably, the first filter is a bloom filter, and the second filter is a tag filter.

Preferably, the tag filter includes tags of the multiple key-value pairs, and the tag is a key hash value of the multiple key-value pairs.

Preferably, the tags of the plurality of key-value pairs occupy a memory space of fixed size respectively.

Preferably, the key of the said plurality of key-value pairs comprises a prefix end and a suffix end, and the tag of the said plurality of key-value pairs comprises the prefix tag calculated based on the said prefix end and suffix tag calculated based on the said suffix end.

Preferably, the prefix tag and the suffix tag are hash values calculated using different hash algorithms.

Preferably, the suffix tag is a hash value calculated using an order-preserving hash algorithm.

Preferably, the step of globally sorting the matching tags in the SST file set using the said second filter comprises: filtering the tags of each SST file in the said SST file set to obtain a matching tag set for each SST file; and globally sort all matching tags of the SST files in the SST file set according to their suffix tags, wherein the matching tags in the global tag set are sorted in ascending order according to the suffix tags.

Preferably, the prefix tag of the matching tag is equal to the prefix tag of the query key, and the suffix tag of the matching tag is greater than or equal to the suffix tag of the query key.

Preferably, the step that selects a SST file to carry out file IO operation according to the global tag set comprises: traversing the said global tag set to obtain the tag of the most relevant key-value pair; performing a file IO operation on the SST file associated with the tag of the most relevant key-value pair to read the data content of the key-value pair corresponding to the tag; and comparing the query key with the read key-value pair for query validation.

Preferably, in the case of query validation failure, the traversal of the global tag set continues, and in the case of query validation success, the traversal of the global tag set stops, and the read key-value pairs are returned as the search result.

Preferably, in the case where multiple matching tags that are equal to each other exist in the global tag set, file IO operations are performed on the SST files associated with each of the multiple matching tags to read the data content of the multiple key-value pairs, and the keys of the multiple key-value pairs are sorted based on their data content.

Preferably, in the metadata segments of the multiple SST files, the key-value pairs stored in the data segments of the multiple SST files are indexed according to the hierarchical manner of data buckets, data pages and data slices.

Preferably, the metadata segments of the plurality of SST files respectively include a bucket metadata area and bucket descriptors, and the bucket descriptors are used to describe the starting position and size of the metadata of a plurality of data buckets in the bucket metadata area.

Preferably, the bucket metadata area includes a page index area and a tag area, and the tags of the plurality of key-value pairs are stored in the tag area.

Preferably, the process of opening the database further comprises: preloading the metadata segments of the plurality of SST files of the database into the memory.

Preferably, before performing file IO operations to read key-value pairs, the process further includes: searching for the matching key-value pairs of the query key in at least one of the memory table and the immutable memory table. Adding the key-value pairs found in at least one of the memory table and the immutable memory table to the result set; adding the read key-value pairs obtained from file IO operations to the result set; and selecting the minimum value in the result set as the search result.

According to a second aspect of the present disclosure, a data storage device is provided, comprising: a plurality of SSD storage devices, on which a plurality of SST files are stored; a processor and a memory, wherein the processor is used to execute instructions to perform the following steps: in the data segments of the multiple SST files, storing a plurality of key-value pairs using standardized storage units; in the metadata segments of the multiple SST files, establishing a first filter and a second filter; using the first filter to obtain the SST file set that match the query key; using the second filter to globally sort the matching tags in the SST file set to generate a global tag set; selecting the SST files according to the global tag set to perform file IO operations to read key-value pairs.

In the data storage system according to an embodiment of the present disclosure, two filters are established in the SST file. The first filter is, for example, a bloom filter in the SST file, and is used to indicate the matching relationship between the query key and files in the plurality of SST files. The second filter is, for example, a tag filter in the SST file, which is used to locate the key-value pairs in the file and sort the key-value pairs.

According to the storage control method of the embodiment of the present disclosure, when performing data read operations, according to the suffix tag in the tag filter, a plurality of key-value pairs with the same prefix tag are sorted. This allows for pre-filtering of multiple SST files, i.e., pre-determining which file to perform file IO operations on in multiple SST files to read the most relevant key-value pairs. Therefore, the storage control method according to this embodiment can reduce the number of file IO operations, thereby improving file IO efficiency.

DESCRIPTION OF DRAWINGS

The above and other objects, features and advantages of the present disclosure will be more clearly understood through the following detailed description of the embodiments of the present disclosure with reference to the accompanying drawings.

DESCRIPTION OF DETAIL EMBODIMENTS

Figure 1:
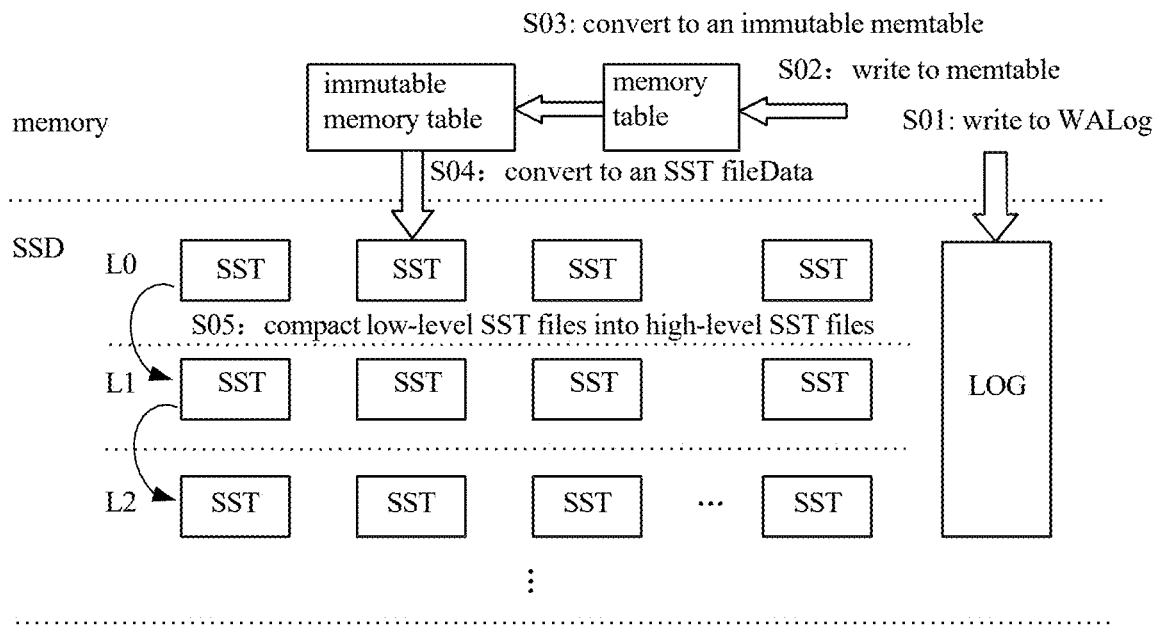
FIG. 1 shows a schematic block diagram of a log-structured merge tree-based data storage system.

The present disclosure will be described in more detail below with reference to the accompanying drawings. In the various figures, identical elements are indicated with similar reference numerals. For the sake of clarity, various parts in the drawings have not been drawn to scale. Also, some well-known parts may not be shown.

The present disclosure is described below based on examples, but the present disclosure is not limited only to these examples. In the following detailed description of the disclosure, some specific details are set forth in detail. The present disclosure can be fully understood by those skilled in the art without the description of these detailed parts. Well-known methods, procedures, procedures, components, and circuits have not been described in detail so as not to obscure the essence of the present disclosure.

FIG. 1 shows a schematic block diagram of a log-structured merge tree-based data storage system.

In a data storage system for big data storage, a key-value database is an important database type. Compared with traditional relational databases, key-value (key-value) databases use keys to identify data rows, not limited to fixed data table structures, thus saving time and space overhead, and reducing the number of reads and writes to the disk and improving read and write performance.

The key-value (key-value) database can be implemented using a log-structured merge tree (Log Structured Merge Tree, LSM-Tree). Data storage systems based on the log-structured merge tree include the existing RocksDB structure or LevelDB structure, etc. Taking RocksDB as an example, as shown in FIG. 1, the data storage system based on the log-structured merge tree includes a memory layer and a persistence layer.

In the memory layer, key-value pairs can be stored in a memory table (Memtable) and an immutable memory table (Immutable Memtable), and the two together form a structure for organizing and maintaining data in memory. In the persistence layer, key-value pairs are stored in data files in multiple hierarchies. The persistent layer is implemented by hardware such as hard disk storage device (for example, Solid-State Disk, namely SSD). For example, a Sorted String Table is a data file used to store key-value pairs.

The memory layer and the persistence layer of the data storage system jointly maintain the data storage of key-value pairs. When writing a key-value pair, first store the key-value pair in the memory layer, and when the storage space in the memory reaches a predetermined value, transfer the memory data to the persistence layer to form a data file.

Further, in the persistence layer, if the quantity or size of the SST files of the L0 level reaches a predetermined threshold, the SST files of the L0 level will be merged and sorted, thereby forming the SST files of the L1 level. Further, the L1-level SST files may be merged into L2-level SST files, thereby forming multiple levels of SST files. The merging process of the SST file is also called compaction (Compaction).

Therefore, the latest data is stored in the memory layer, and relatively new data is stored in the SST file of a lower level (for example, L0 level) in the persistence layer.

Referring to FIG. 1, when a data update request (such as a put, update, delete operation) is received, the data writing process performed by the data storage system includes steps S01 to S04.

In step S01, before the data is written into the memory buffer, the key-value pair is written into the pre-write log, also known as the write-ahead log (WriteAheadLog, WAL).

In step S02, the data is written into memory table Memtable.

In step S03, if the data size of the memory table Memtable reaches a predetermined threshold (for example, 64 MB), then the memory table (labeled as Memtable in the drawings) is closed and converted into the immutable memory table (labeled as Immutable Memtable), meanwhile, create a new memory table to respond to new data update request.

In step S04, after step S03, initiate a background task immediately to translate the key-value in the immutable memory table (labeled as Immutable Memtable) to an SST file, which is written to the SSD storage device, thereby the memory data is written into an SST file to form persistent storage. The file transfer operation in the above step S04 is also referred to as Flush. After Flush, the system releases the resources occupied by Immutable Memtable.

In step S05, the SST files of low level are compacted into the SST files of high level. For example, when the total size of SST files at a certain level exceeds a predetermined threshold (the threshold of SST files at each level can be different, and the threshold of SST files at a higher level can be several times the threshold of SST files at a lower level), then the SST files are merged and converted into one SST file, and stored as a higher-level SST file. The file merging process is also called Compaction.

When receiving data read operation (such as get operation), the data query process that data storage system carries out comprises accessing the memory table Memtable and the immutable memory table (labeled as Immutable Memtable in the drawings) in the memory layer. If the query key cannot be matched in memory, the SSTable Info Cache maintained in memory is used to locate the SST file, and the filter corresponding to the SST file is used to determine whether the query key exists in the SST file. If the query key exists in the SST file, the SST file is read to obtain the matching key-value pair as the query result. In the data read operation, the query result can be obtained from the lower-level (such as L0) SST files first. If no matching key-value pair exists in any SST file up to the highest level (such as Ln), it means that the key-value pair does not exist in both the memory and the persistence layer.

The above-mentioned data storage system based on a log-structured merging tree uses SST files to realize persistent storage. SST files not only contain the data itself, but also metadata, which includes filters, for example. The filter in an SST file is used to determine whether the query key matches the key set of the SST file. Examples of filters include bloom filter (labeled as Bloom Filter in the drawings), Quotient Filter (labeled as Quotient Filters in the drawings), etc.

The above-mentioned data storage system based on a log structured merging tree can realize the following characteristic in data read operation: if there is a plurality of matching data in data storage system, the data read operation can read the latest matching data first.

Figure 2:
FIG. 2 shows a schematic diagram of the data structure of SST file in a data storage system according to the prior art.
Figure 2:
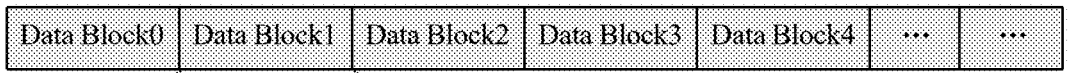
Figure 2:
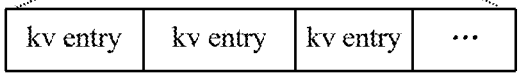
Figure 2:
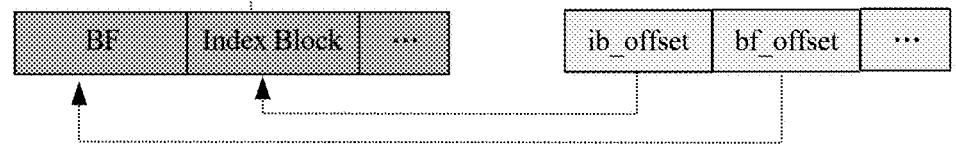

FIG. 2 shows a schematic diagram of the data structure of an SST file in a data storage system according to the prior art.

In the data storage system according to the prior art, the SST file includes a plurality of blocks (Block). The size of each block is fixed, for example, it is configured to be the same as the page size of the SSD storage device, for example, 4 KB. Taking RocksDB as an example, as shown in FIG. 2, the SST file includes multiple data blocks Data Block, multiple metadata blocks Meta Block, and a metadata index block Meta Index Bock.

The data blocks Data Block of the SST file are used to store all key-value pairs. In each data block, for example, multiple key-value pairs are stored in a contiguous manner. The metadata blocks Meta Block of the SST file are used to store metadata, such as the Bloom filter BF constructed based on all key-value pairs in the SST file, and the index keys of the data block Data Block. The metadata index block Meta Index Block of the SST file is used to store the index information of the metadata blocks, for example, the number of the metadata blocks, the offset of the index block, the offset of the Bloom filter, and the like.

In addition, the SST file also includes a Footer, which describes the additional information of the SST file.

During the data reading operation, a method is to preload the metadata of the SST file into the memory. According to the Bloom filter in the metadata, it is determined whether the query key matches the key set of the SST file, and then the file IO operation is performed to read the data block of the SST file. However, the file IO operation can only provide a rough positioning of the data block within the file, which degrades the efficiency of the file IO.

During data reading operation, another method is that the metadata and key-value pairs of an SST file are loaded in memory in advance, according to the Bloom filter in the metadata, judge whether the query key matches the key set of the SST file, and perform in-memory data operations to read the data blocks of the SST file. However, this file loading method consumes a large amount of memory space. Due to the limitation of the memory space of the data processing system, it is difficult to execute read and write operations of multiple storage channels in parallel in a data processing system using a single CPU or a single CPU core.

Figure 3:
FIG. 3 shows a schematic diagram of the data structure of SST file in a data storage system according to an embodiment of the present disclosure.
Figure 3:
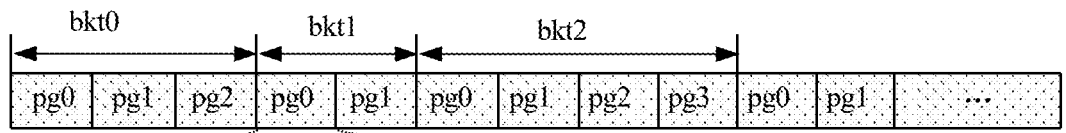
Figure 3:
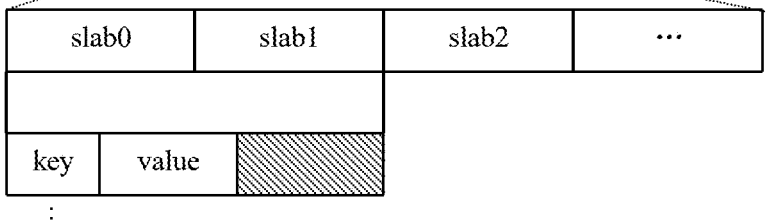
Figure 3:
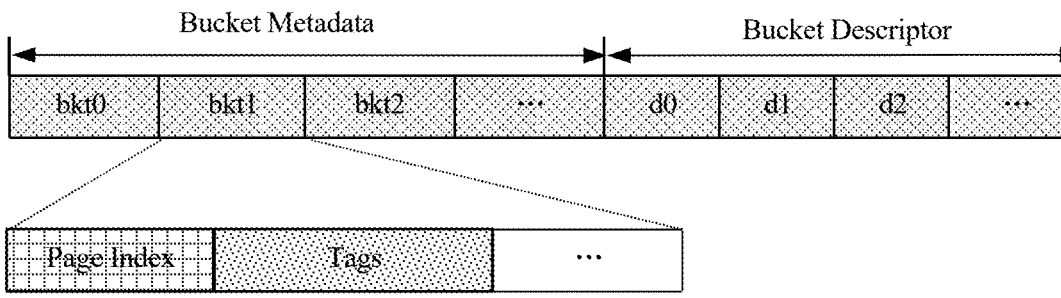
Figure 3:
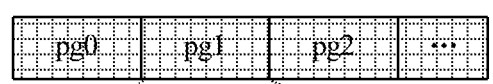
Figure 3:
Figure 3:
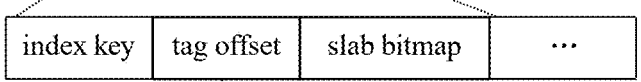
Figure 3:
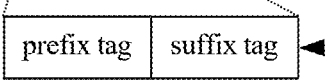

FIG. 3 shows a schematic diagram of a data structure of an SST file in a data storage system according to an embodiment of the present disclosure.

In the data storage system according to an embodiment of the present disclosure, the SST file includes a plurality of segments (labeled as Segment in the drawings). As shown in FIG. 3, the SST file includes a data segment (labeled as Data Segment in the drawings), a metadata segment (labeled as Meta Segment in the drawings), a Bloom filter (labeled as BF in the drawings) and a footer. When opening the data, the metadata segment (labeled as Meta Segment in the drawings) and Bloom filter BF of the SST file can be loaded into the memory in advance, thus residing in the memory.

The data segment (labeled as Data Segment in the drawings) of the SST file includes multiple data buckets (labeled as Bucket in the drawings). Further, each data bucket (labeled as Bucket in the drawings) includes at least one continuous data page (labeled as Page in the drawings), and each data page includes at least one continuous data slice (labeled as Slab in the drawings).

In this embodiment, the size of the data bucket is not fixed, that is, the size of the data bucket is proportional to the number of data pages, and the data page and the data slice (labeled as Slab in the drawings) are standardized storage units with a fixed size. Preferably, the size of the data page of the SST file is the same as the physical page size of the SSD storage device, such as 4 KB, and the size of the data slice (Slab) of the SST file is set to a predetermined value, such as 64 B. Therefore, the sizes of the data page and the data slice (Slab) of the SST file are fixed, and each data page can include 64 data slices (Slab).

In this embodiment, in the data segment (labeled as Data Segment in the drawings) of the SST file, the data contents of multiple key-value pairs are different, therefore, the storage space size of multiple key-value pairs is also variable. In this embodiment, the storage space of each key-value pair occupies at least one data slice (Slab), and the starting position of the storage space of the key-value pair is aligned with the data slice (Slab). Therefore, if the storage space of the key-value pair occupies multiple consecutive data slices (Slab), the last data slice (Slab) may not be fully occupied.

The metadata segment (labeled as Meta Segment in the drawings) of the SST file includes bucket metadata (labeled as Bucket Meta Data in the drawings) and bucket descriptor (labeled as Bucket Descriptor in the drawings). For each data bucket (labeled as Bucket in the drawings) in the data segment (labeled as Data Segment in the drawings) of the SST file, there is a corresponding bucket metadata (labeled as bkti in the drawings) and a bucket descriptor (labeled as di in the drawings) in the metadata segment (labeled as Meta Segment) of the SST file, where i represents the ith Data bucket (labeled as Bucket in the drawings).

In this embodiment, the bucket metadata includes page indexes of multiple data pages in the data bucket and tags of multiple key-value pairs. The bucket descriptor is used to describe the starting position and size of the corresponding bucket metadata.

The page index is an index structure related to the data page. For each data page in the data segment of the SST file, the metadata segment of the SST file retains a corresponding index structure to store the page index.

The index structure (labeled as index struct in the drawings) includes an index key, a tag offset (labeled as tag offset in the drawings), and a data slice bitmap (labeled as slab bitmap in the drawings). The index key is the key of the first key-value pair in the data page (in principle, index key>=all keys in the page or index key<=all keys in the page is sufficient), and is used for binary search. The tag offset refers to the offset in the tag area of the tag corresponding to the first key-value pair in the data page. The data slice bitmap (labeled as slab bitmap in the drawings) describes whether each data slice in the data page is the starting point of a new record.

In the present embodiment, the metadata segment (labeled as Meta Segment in the drawings) of the SST file indexes the key-value pairs stored in the data segment of the said a plurality of SST files in a hierarchical manner based on the data bucket, data page, and data slice. If the query key matches the tag, then based on the tag offset and the data slice bitmap, the data slice number and the number of data slices matching the query key can be calculated.

During the data reading operation, the metadata segment, the bloom filter, and the footer (labeled as Footer in the drawings) of the SST file can be preloaded into the memory. Therefore, this file loading method does not need to load the entire content of the SST file, which can save a lot of memory space. Even if the memory space of the data processing system is limited, the index data of multiple SST files can be loaded into the memory, and the read and write operations of multiple storage channels can be executed in parallel in a data processing system with a single CPU or a single CPU core.

Furthermore, according to the Bloom filter BF in the SST file, it can be determined whether the query key matches the key set of the SST file. Based on the page index Page Index and tag Tag in the metadata segment, the key-value pairs can be accurately located in the data slices of the SST file through memory data operations, achieving data slice level accuracy in-file positioning. In the file I/O operation, only the content related to the specific data slices Slab needs to be read, thus improving file I/O efficiency.

In this embodiment, the keys of a plurality of key-value pairs in the SST file include a prefix part and a suffix part respectively. A first filter and a second filter are established in the SST file. The first filter is, for example, a bloom filter in the SST file, and the second filter is, for example, a tag filter in the metadata segment of the SST file. The Bloom filter is constructed based on the set of prefix parts of all key-value pairs, and the tag filter includes the tag Tag of all key-value pairs. The Bloom filter is used to indicate the matching relationship between the query key and the files in multiple SST files. Furthermore, the tag filter is used to implement the in-file positioning and sorting of key-value pairs.

In the SST file, the tag area in the metadata segment is used as a tag filter, wherein the tags of a plurality of key-value pairs include two hash values (for example, 1B in size respectively). The hash values calculated by the prefix part and suffix part of the key are respectively called prefix tag (labeled as Prefix Tag in the drawings) and suffix tag (labeled as Suffix Tag in the drawings). For example, the prefix tag and the suffix tag are key hash values obtained by a standard hash algorithm and an order-preserving hash algorithm, respectively. Compared with the standard hash algorithm, the key hash value obtained by the order-preserving hash algorithm retains the order relationship of multiple keys. The hash value calculated by the order-preserving hash algorithm satisfies the "order-preserving" property, i.e., if $xi<xj$, then $h(xi)<=h(xj)$.

Therefore, the prefix tag and the suffix tag in the tag Tag can be used as positioning tags to indicate the in-file positioning of the key-value pairs matching the query key in multiple SST files. Furthermore, the suffix tag is also used as the sorting tag to indicate the order of multiple key-value pairs with the same prefix tag. As mentioned above, multiple key-value pairs with the same prefix tag matching the query key may exist in the same SST file or in multiple SST files. Regardless of whether multiple key-value pairs are located in the same SST file or multiple SST files, multiple key-value pairs can be sorted by using the suffix tag in the tag.

During data reading operations, sorting multiple key-value pairs with the same prefix tag based on the suffix tag in the tag filter can pre-filter multiple SST files, i.e., pre-determine which file to perform file I/O operations on among multiple SST files, and read the most relevant key-value pairs. Therefore, the storage control method of this embodiment can reduce the number of file I/O operations and further improve file I/O efficiency.

Figure 4:
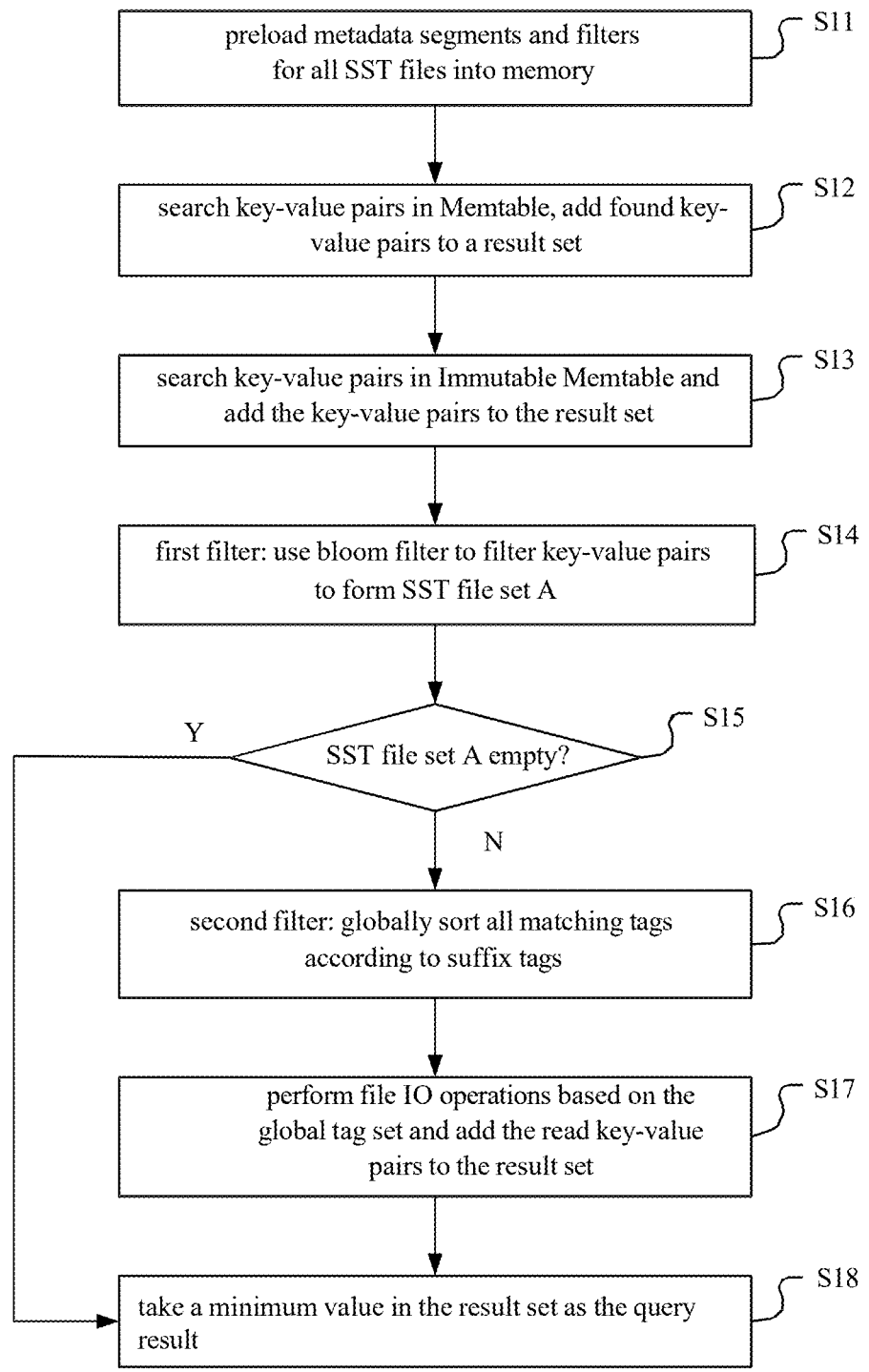
FIG. 4 shows a schematic flowchart of a storage control method according to an embodiment of the present disclosure.

FIG. 4 shows a schematic flowchart of a storage control method according to an embodiment of the present disclosure. The storage control method includes a plurality of steps S11 to S18 related to a data read operation.

In the data storage system, the data read operation comprises searching the memory layer and the persistence layer of the data storage system according to the query key, so as to obtain the search result that matches the query key. The search result is, for example, key-value pair data matching the query key.

In step S11, when the database is opened, the metadata segments and filters of all SST files in the data storage system are loaded into the memory.

The data storage system according to the embodiment of the present disclosure uses standardized storage units to store key-value pairs and use double filters to locate the storage units for the query key in the SST files.

The metadata segments of the SST files are indexed in a hierarchical manner based on data buckets, data pages, and data slices to store the key-value pairs in the data segments of multiple SST files. Therefore, compared to directly loading data segments of SST files, loading metadata segments and bloom filters of SST files in memory can significantly reduce memory space.

When the data storage system has an appropriate total memory and total hard disk space configuration, it is sufficient to store the metadata segments and bloom filters of all SST files in the memory. That is, in the storage control method according to the embodiment of the present disclosure, the metadata segments and filters of all SST files in the data storage system are resident in memory as index data, without additional reading from the SSD storage media.

In the data storage system based on the log structured merge tree, the data update operation includes the data writing process in the memory layer and the persistence layer. In the dynamic data update operation, key-value pairs may be stored in the memory table Memtable and immutable memory table Immutable Memtable in the memory layer, and the SST file in the persistence layer of the data storage system. The key-value pairs in the memory table Memtable are always the latest data. Therefore, in the data reading operation, key-value pairs are searched in turn in the memory table (labeled as Memtable in the drawings) and the immutable memory table (labeled as Immutable Memtable in the drawings) in the memory layer, and the SST file in the persistence layer.

In step S12, search the key-value pairs in the memory table (labeled as Memtable in the drawings). If the first matching key-value pair is found, the data of the first key-value pair is added to the result set.

In step S13, search the key-value pairs in the immutable memory table (labeled as Immutable Memtable in the drawings). If the second matching key-value pair is found, the data of the second key-value pair is added to the result set.

In step S14, use bloom filter to filter the key-value pairs, to form the SST file set A that matches the query key.

According to the bloom filter BF of the SST file, it can be determined whether the query key matches the key set of the SST file. In this step, all SST files are traversed, and for each SST file, the bloom filter that resides in memory is obtained, and the key-value pairs are filtered by the bloom filter, that is, it can be determined whether the SST file contains key-value pairs matching the query key. Subsequently, the matching SST files in all SST files are constructed into SST file set A.

In this embodiment, the keys of a plurality of key-value pairs in the SST file include a prefix part and a suffix part respectively. The bloom filter is based on the set of prefix parts of all key-value pairs. Using the bloom filter to filter the key-value pairs, which can obtain multiple SST files containing the multiple key-value pairs with the same prefix tag.

In step S15, it is determined whether the SST file set is empty. If the SST file set is not empty, it is confirmed that at least one SST file may contain a matching key-value pair, and step S16 is continued. If the SST file set is empty, it is confirmed that none of the SST files contain matching key-value pairs, and proceed to step S18.

In step S16, according to the suffix tag in the tag filter, all matching tags in the SST file set A are globally sorted to form a global tag set.

According to the tag filter of the SST file, the file internal positioning and sorting of key-value pairs can be realized. In this step, all SST files in the SST file set A are traversed. For each SST file, the resident tag filter in memory is obtained, and the suffix tags in the tag filter can be used to globally sort all matching tags.

In this embodiment, the keys of a plurality of key-value pairs in the SST file include a prefix part and a suffix part respectively. The Bloom filter is used to obtain multiple SST files, containing multiple key-value pairs with the same prefix tag, and the tags of multiple key-value pairs can be globally sorted according to the suffix tags of the tag filter. Here, the term "global sorting" means that for all SST files in SST file set A, the tag sorting of multiple key-value pairs only depends on the suffix tags of multiple key-value pairs, and is independent of the order of the SST files. Further, according to the tag sorting of multiple key-value pairs, the sorting of the keys of multiple key-value pairs can be obtained.

In step S17, the file IO operations are performed according to the global tag set, and the key-value pairs read are added to the result set.

In the global tag set, the sorted tags are sorted in ascending order according to the suffix tags, representing the most relevant key-value pairs to the least relevant key-value pairs. For example, the most relevant key-value pair is the smallest key-value pair that matches the query key prefix and has a suffix greater than or equal to the query key suffix.

For multiple tags of the global tag set, the file IO operation is performed on the SST file corresponding to the first tag, and the most relevant key-value pair can be read. Further, if the query key exactly matches the read key-value pair, the key-value pair corresponding to the first tag is used as the search result.

In step S17, the minimum value is taken from the result set as the query result.

The result set of above-mentioned data query operation comprises the search results from a total of three sources: the memory table (labeled as Memtable in the drawings), the immutable memory table (labeled as Immutable Memtable in the drawings), and the SST files. Taking the minimum value in the result set can further obtain the most relevant key-value pair in the search results from the three sources.

According to the storage control method of an embodiment of the present disclosure, the above-mentioned steps of the data reading operation use the double filters preloaded into the memory, wherein the first filter is a bloom filter of the SST file, and the second filter is a tag filter in the metadata segment of the SST file.

In the above-mentioned data reading operation, use the double filter resident in the memory to carry out file matching, file selection and file IO operation successively. In the file matching stage, according to the Bloom filter of the SST file, determine whether the query key matches the key set of the SST file, so that the SST file set matching the query key can be constructed. In the file selection stage, the global sorting of multiple key-value pairs is realized according to the suffix tags in the metadata segment, and then the most relevant key-value pairs are selected in the SST file set to perform file IO operations on the corresponding SST files, thus reducing the number of files and the number of IO operations. In the file IO operation stage, the key-value pair is located in the file according to the prefix tag and suffix tag in the metadata segment, and the data slices of the key-value pair in the SST file can be located based on the memory data operation, so as to achieve accurate positioning within the file with the accuracy of the data slices. Therefore, only the content related to the specific data slice (labeled as Slab in the drawings) needs to be read during the file IO operation, thus improving the efficiency of the file IO.

Figure 5:
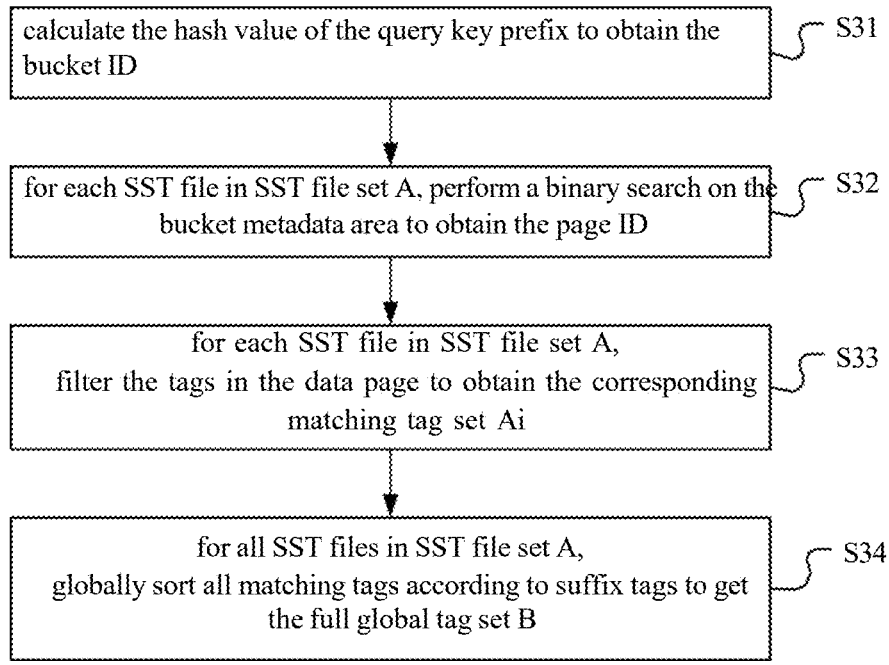
FIG. 5 shows a detailed flowchart of performing global sorting on tags in the storage control method shown in FIG. 4.
Figure 6:
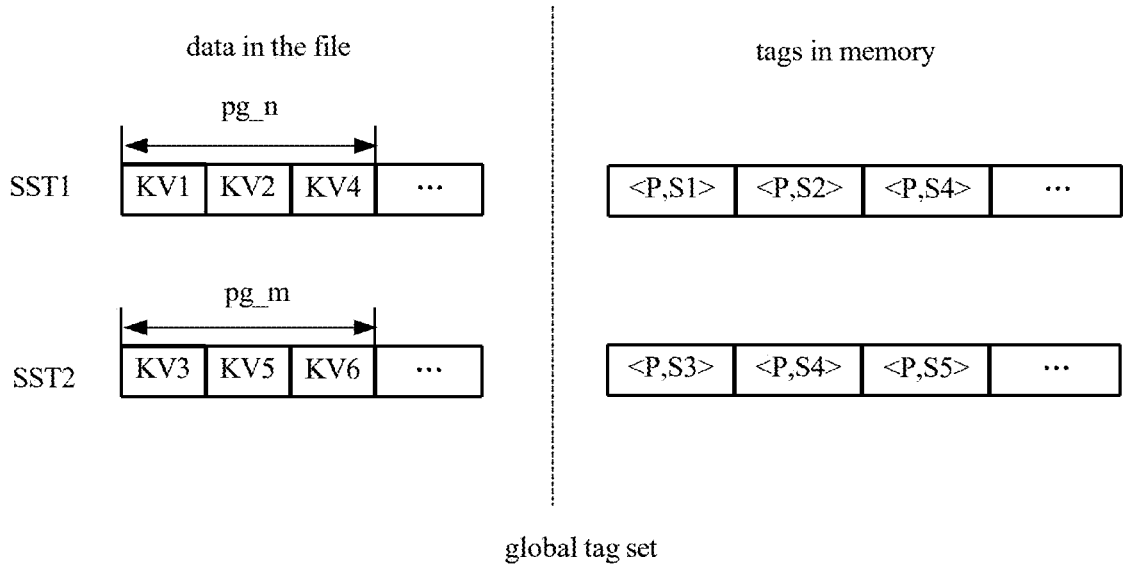
FIG. 6 shows a schematic diagram of a global tag set obtained after the tags are globally sorted in the storage control method shown in FIG. 4.

FIG. 5 and FIG. 6 respectively show a detailed flowchart of performing global sorting on tags in the storage control method shown in FIG. 4, and a schematic diagram of a global tag set obtained after global sorting.

According to the storage control method of the embodiment of the present disclosure, in the file matching stage, according to the bloom filter of the SST file, the SST file set A matching the query key is constructed. Referring to FIG. 6, the SST file set A includes SST files SST1 and SST2.

Further, in the file selection stage, according to the tag filter in the metadata segment of the SST file, all matching tags of the SST file set A are globally sorted. Referring to FIG. 5, the global sorting includes the following steps S31 to S34.

In step S31, calculate the hash value of the query key to obtain the bucket number of the data bucket in the SST file.

In step S32, for each SST file in the SST file set A, according to the bucket number of the data bucket, a binary search is performed in the page index of the bucket metadata of the SST file to obtain the page number.

Referring to FIG. 6, in the SST files SST1 and SST2 in the SST file set A, the page numbers found are pg_n and pg_m, respectively.

In step S33, for each SST file in the SST file set A, the tags in the data page are filtered to obtain the corresponding matching tag set Ai.

The prefix tag and the suffix tag of query key are calculated according to the prefix part and suffix part of the query key, represented as tag<P, S0>, wherein, P represents the prefix tag of the query key, and S0 represents the suffix tag of the query key.

Further, the tag <P, S0> of the query key is compared with multiple tags in the data page, and the matching tags in the data page are selected to form a matching tag set Ai. Here, the prefix tags of the matching tags for the query key are all equal to the prefix tag of the query key, and the suffix tags of the matching tags for the query key are all greater than or equal to the suffix tag of the query key.

Referring to FIG. 6, for the SST file SST1 in the SST file set A, in the data page pg_n, the matching tag set A1 obtained according to the tag filter includes tags <P, S1>, <P, S2>, <P, S4>, where the suffix tags S1, S2, and S4 of the matching tags are all greater than or equal to the suffix tag of the query key. For the SST file SST2 in the SST file set A, in the data page pg_m, the matching tag set A2 obtained according to the tag filter includes tags <P, S3>, <P, S4>, <P, S5>, where the suffix tags S3, S4, and S5 of the matching tags are all greater than or equal to the suffix tag of the query key.

Further, the tags, <P, S1>, <P, S2>, <P, S4>, in the matching tag set A1 of SST file SST1, represent key-value pairs KV1, KV2, and KV4. The tags <P, S3>, <P, S4>, <P, S5> in the matching tag set A2 of the SST file SST2 respectively represent the key-value pairs KV3, KV5, and KV6 in the data segment of the SST file SST2.

In step S34, for all SST files in the SST file set A, all matching tags are globally sorted according to the suffix tag, to obtain the global tag set B.

In this embodiment, the global tag set is not only the complete set of matching tag sets Ai of all SST files, but also globally sorts all matching tags according to suffix tags.

Referring to FIG. 6, global tag collection B comprises all tag and corresponding file of suffix tag reordering, successively arranged in the order of: <P, S1>SST1, <P, S2>SST1, <P, S3>SST2, <P, S4>SST1, <P, S4>SST2, and <P, S5>SST2.

For the case where the suffix tags are not equal to each other, for example, the tag <P, S1> of the SST file SST1 is smaller than the tag <P, S2>, then the tag order in the global tag set B can represent the key order. For the case where the suffix tags are equal to each other, the tag order in the global tag set B cannot represent the key order. For example, the tag <P, S4> of the SST file SST1 is equal to the tag <P, S4> of the SST file SST2, but key-value pair KV4 of the tag of the SST file SST1 is smaller than the key-value pair KV5 of SST file SST2.

As described below, when the suffix tags are equal to each other, it is necessary to perform file IO operations to read the key-value pairs in the data segments of the SST files to obtain an accurate key sequence.

Figure 7:
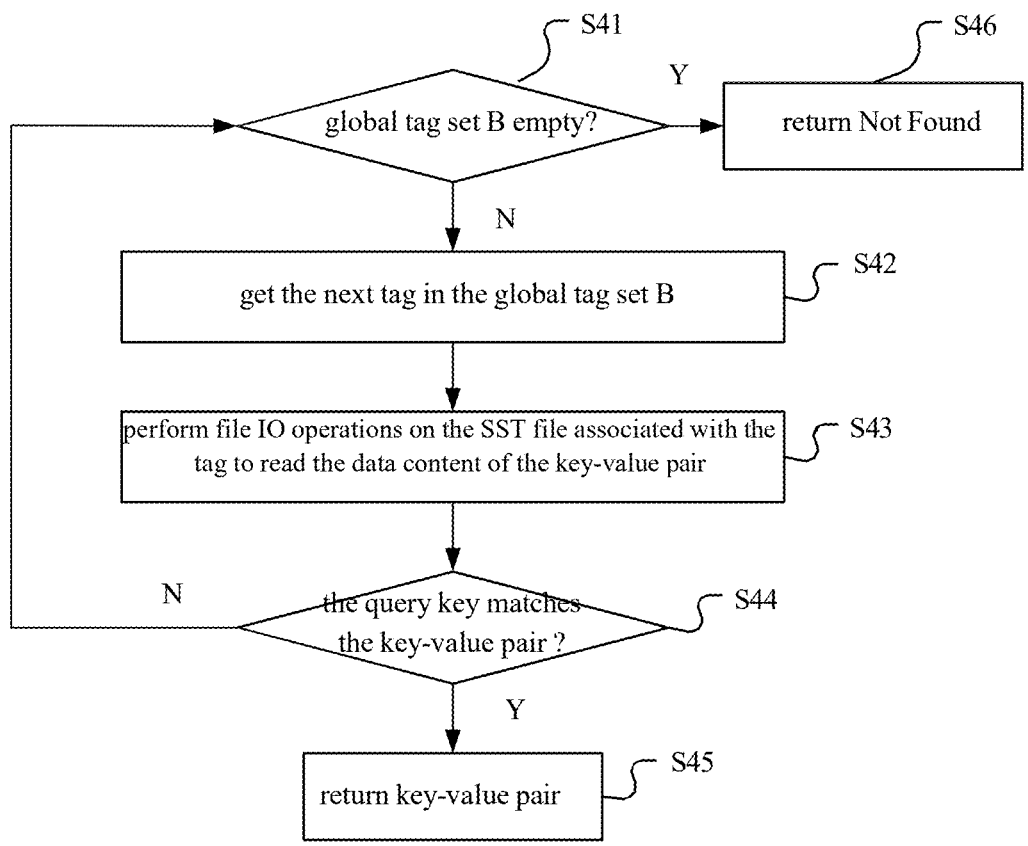
FIG. 7 shows a detailed flowchart of performing file IO operations according to the global tag set in the storage control method shown in FIG. 4.

FIG. 7 shows a detailed flowchart of performing file IO operations according to the global tag set in the storage control method shown in FIG. 4.

According to the storage control method of an embodiment of the present disclosure, in the file selection stage, according to the tag filter in the metadata segment of the SST file, all matching tags of the SST file set A are globally sorted to obtain the global tag set B.

Further, in the file IO operation stage, the file IO operation is performed to read the most relevant key-value pair according to the global tag set. Referring to the figure, the file IO operation includes the following steps S41 to S46.

In step S41, it is determined whether the global tag set B is empty.

If the global tag set B is not empty, step S42 is executed to start traversing the global tag set B. If the global tag set B is empty, step S46 is executed, and the search result returned is that no key-value pair is found in any SST file.

In step S42, obtain the next tag in the global tag set B.

Since multiple tags in the global tag set B have been globally sorted, they represent the most relevant key-value pair to the least relevant key-value pair. Therefore, during the traversal process of the global tag set B, the first tag represents the most relevant key-value pair.

Referring to FIG. 6, in the global tag set B, the first tag <P, S1>SST1 indicates that the most relevant key-value pair may exist in the SST file SST1 associated with the first tag. Further, the following step S43 is executed to read the data content of the key-value pair for query validation.

In step S43, the file IO operation is performed on the SST file associated with the tag to read the data content of the key-value pair.

In this step, the data slice number and the number of data slices matching the query key data can be calculated according to the tag, achieving accurate file-level positioning at the data slice precision. In the file IO operation, it is only necessary to read the content related to the specific data slices Slab to obtain the data content of the key-value pair.

In step S44, it is determined whether the query key matches the key-value pair read.

In this step, the query key is compared with the key-value pair read for query validation. If the validation fails, return to step S41 and continue traversing the global tag set B. If the validation is successful, step S45 is executed, and the read key-value pair is returned as the search result.

Referring to FIG. 6, if the first three tags in the global tag set B fail the query validation, the global tag set is traversed to the fourth tag <P, S4>SST1 and the fifth tag <P, S4>SST2, which are equal to each other. At this time, the order of the tags for multiple key-value pairs cannot represent the order of the keys. However, by reading the data content of the corresponding key-value pairs in the SST files SST1 and SST2 in the above step S43, the key order of the multiple key-value pairs can still be determined.

Figure 8:
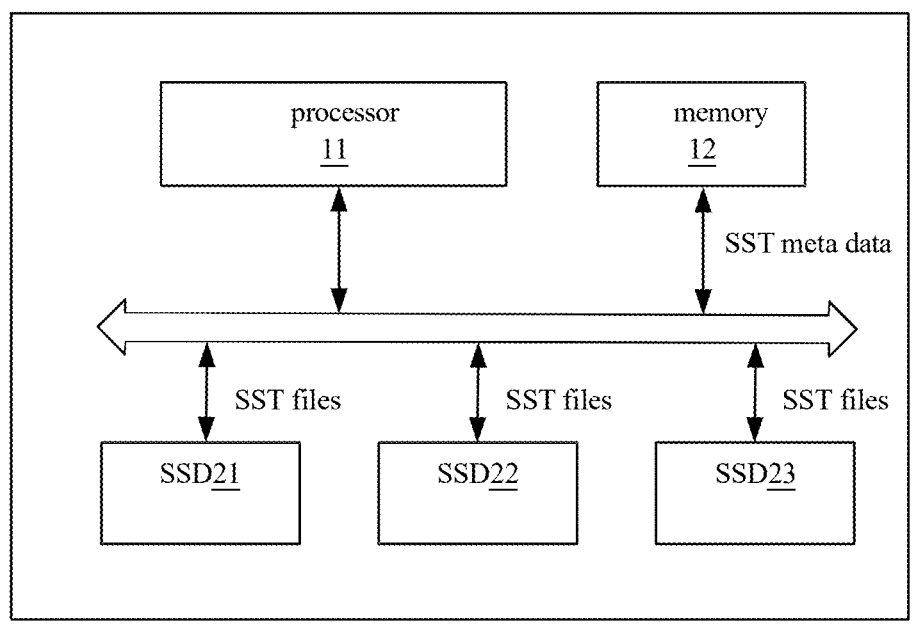
FIG. 8 shows a schematic block diagram of a data storage device according to an embodiment of the present disclosure.

FIG. 8 shows a schematic block diagram of a data storage device according to an embodiment of the present disclosure.

Referring to FIG. 8, it is a schematic diagram of a data storage device provided by an embodiment of the present application. The data storage device 10 includes a processor 11, a memory 12, and SSD storage devices 21 to 23. On the SSD storage devices 21 to 23, a plurality of SST files are stored in the form of a log-structured merge tree. During the operation of the data storage device, the data storage device 10 loads computer-readable instructions into the memory 12 and can run the computer-readable instructions on the processor 11, such as a storage control program based on a log-structured merge tree. When the processor 11 executes the computer-readable instructions, the steps in the above embodiment of the storage control method based on the log-structured merge tree are implemented.

Those skilled in the art can understand that FIG. 8 is only an example of the data storage device 10, and does not constitute a limitation to the data storage device 10, and may include more or fewer components than those shown in the figure, or combine certain components, or include different components, such as input and output devices, network access devices, buses, and the like.

The said processor 11 can be a central processing unit (CPU), or other general-purpose processors, digital signal processor (DSP), application specific integrated circuit (ASIC), field-programmable gate array (FPGA) or other programmable logic devices, discrete gate or transistor logic devices, discrete hardware components, etc. The general-purpose processor can be a microprocessor or any other conventional processor, etc., and the processor 11 is the control center of the data storage device 10, connecting various parts of the data storage device 10 with various interfaces and lines.

The memory 12 can be used to store computer-readable instructions. The processor 11 realizes various functions of the data storage device 10 by running or executing computer-readable instructions or modules stored in the memory 12, and accessing data stored in the memory 12. The memory 12 can mainly include a program storage area and a data storage area. The program storage area can store an operating system, at least one application required for a function (such as sound playback function, image playback function, etc.); the data storage area can store data created according to the use of the data storage device 10. In addition, the memory 12 may include a hard disk, memory, plug-in hard disk, smart media card (SMC), secure digital (SD) card, flash card, at least one magnetic storage device, flash memory device, read-only memory (ROM), random access memory (RAM) or other non-volatile/volatile memory devices.

If the integrated modules of the data storage device 10 are implemented as software functional modules and sold or used as independent products, they can be stored in a computer-readable storage medium. Based on this understanding, all or part of the processes of the above-mentioned embodiments can also be completed by controlling related hardware with computer-readable instructions. The computer-readable instructions can be stored in a computer-readable storage medium, when the computer-readable instructions are executed by the processor, the steps of the above-mentioned embodiments can be realized. The computer-readable instructions include computer-readable instruction codes, which may be in source code form, object code form, executable file or some intermediate form. The computer-readable storage medium may include any entity or device that can carry computer-readable instruction codes, recording media, USB drives, mobile hard disks, disks, CDs, computer memories, read-only memories (ROM), random access memories (RAM), etc.

The present embodiment also provides a computer storage medium that stores computer instructions. When these computer instructions are executed on an electronic device, the electronic device performs the storage control method based on the log-structured merge tree described in the above embodiments.

The present embodiment also provides a computer program product that, when executed on an electronic device, causes the electronic device to perform the above steps to implement the storage control method based on the log-structured merge tree described in the above embodiments.

Furthermore, the embodiment of the present application also provides a type of device, and this device can specifically be chip, component, or module, and this device can comprise connected processor and memory; wherein the memory is used for storing computer-executable instructions. During device operation, the processor can execute the computer-executable instructions stored in the memory, so that the chip executes the storage control method based on the log-structured merge tree in the above embodiments.

Wherein the electronic device, computer storage medium, and computer program product or chip provided by the present embodiment are all used to carry out the above said method. Therefore, the beneficial effects that they can achieve can be referred to the beneficial effects described in the corresponding methods above, and are not repeated here.

Through the description of the above embodiments, those skilled in the art can clearly understand that for the convenience and simplicity of description, the division of the above-mentioned functional modules is only used for illustration, and in practical applications, the above function implementation can be accomplished with different functional modules, that is, the internal structure of the device is divided into different functional modules to complete all or part of the functions described above.

In the embodiments provided in this application, it should be understood that the disclosed devices and methods can be implemented in other ways. For example, the device embodiment described above is only illustrative. For example, the division of modules or units is only a logical functional division. In actual implementation, other division methods can be used, such as multiple units or components can be combined or integrated into another device, or some features can be ignored or not executed. In addition, the coupling or direct coupling or communication connection between them displayed or discussed can be an indirect coupling or communication connection between some interfaces, devices or units, which can be electrical, mechanical, or other forms.

The units described as separate components can be physically separated or may not be physically separated. The component displayed as a unit can be one physical unit or multiple physical units, which can be located in one place or distributed in different places. Part or all of the units can be selected according to actual needs to achieve the purpose of the present embodiment.

In addition, the functional units in each embodiment of this application can be integrated in one processing unit or can be physically separate, or two or more units can be integrated into one unit. The integrated unit can be implemented in the form of hardware or software functional unit.

If the integrated unit is implemented as a software functional unit and sold or used as an independent product, it can be stored in a readable storage medium. Based on this understanding, the essential or contributing part of the technical solution of embodiments of the present application or all or part of the technical solution can be embodied in the form of a software product, which is stored in a storage medium and includes multiple instructions to enable a device (such as a microcontroller, chip, etc.) or processor to perform all or part of the steps of the various embodiments of the present application. The aforementioned storage medium includes: USB drives, portable hard drives, Read-Only Memory (ROM), Random Access Memory (RAM), disks, or CDs and various other media that can store program code.

Embodiments according to the present disclosure are described above, which do not describe all the details, nor do they limit the invention to the specific embodiments described. Obviously, many modifications and variations are possible in light of the above description. This description selects and specifically describes these embodiments in order to better explain the principles and practical applications of the present disclosure, so that those skilled in the art can make good use of the present disclosure and its variations based on the present disclosure. The present disclosure is to be limited only by the claims, along with their full scope and equivalents.

The invention claimed is:

1. A storage control method based on a log-structured merge tree, said log-structured merge tree comprising
a plurality of Sorted String Table (SST) files stored on at least one storage device, said storage control method comprising:
using standardized storage units to store a plurality of key-value pairs in data segments of the plurality of SST files;
wherein keys of the plurality of key-value pairs comprise a prefix end and a suffix end, and the tags of the plurality of key-value pairs comprise a prefix tag calculated based on the prefix end and a suffix tag calculated based on the suffix end
establishing a first filter and a second filter, in metadata segment of each the plurality of SST files;
obtaining the SST file set matching the query key by using the first filter;
using a second filter to globally sort matching tags in the SST file set to generate a global tag set, wherein the second filter is a tag filter, comprising tags of the plurality of key-value pairs; and performing tag filtering on the SST files in the SST file set respectively to obtain a matching tag set of the SST files; and
selecting SST files based on a global tag set to perform file Input/Output (IO) operations to read key-value pairs;
globally sorting all matching tags of the SST files in the SST file set according to the suffix tags, wherein, the matching tags in the global tag set are sorted according to the suffix tags in ascending order.

2. The storage control method according to claim 1, wherein the first filter is a bloom filter.

3. The storage control method according to claim 2, wherein the tags of the plurality of key-value pairs are key hash values of the plurality of key-value pairs.

4. The storage control method according to claim 3, wherein the tags of the plurality of key-value pairs respectively occupy a memory space of a fixed size.

5. The storage control method according to claim 1, wherein the prefix tag and the suffix tag are respectively hash values calculated by using different hash algorithms.

6. The storage control method according to claim 5, wherein the suffix tag is a hash value calculated using an order-preserving hash algorithm.

7. The storage control method according to claim 1, wherein the prefix tag of the matching tag is equal to the prefix tag of a query key, and the suffix tag of the matching tag is greater than or equal to the suffix tag of the query key.

8. The storage control method according to claim 1, wherein the step of selecting the SST file according to the global tag set to perform the file Input/Output (IO) operation comprises:
obtaining the tags of the most relevant key-value pairs by traversing the global tag set;
performing a file Input/Output (IO) operation on the SST file associated with the tag of the most relevant key-value pair to read the data content of the key-value pair corresponding to the tag; and
the query key is compared to the read key-value pair for query validation.

9. The storage control method according to claim 8, wherein a traversal of the global tag set is continued when the query validation fails, and the traversal of the global tag set is stopped when the query validation is successful, and use the read key-value pair as a query result.

10. The storage control method according to claim 8, wherein, in the case that the global tag set includes a plurality of matching tags that are equal to each other, file Input/Outputs (IOs) are performed on the SST files associated with the plurality of matching tags that are equal to each other to read the data contents of the plurality of key-value pairs, and implement key sorting of the plurality of key-value pairs according to the data contents of the plurality of key-value pairs.

11. The storage control method according to claim 1, wherein in the metadata segments of the plurality of SST files, the data of the plurality of SST files are indexed according to a hierarchical manner of data buckets, data pages and data slices of the key-value pairs stored in the segment, wherein the hierarchical manner is a progressively smaller organization-buckets containing pages, which in turn contain slices-facilitates efficient storage, lookup, and management of key-value pairs in the data segments.

12. The storage control method according to claim 11, wherein the metadata segments of the multiple SST files respectively include a bucket metadata area and a bucket descriptor area, and the bucket descriptors are used to describe a starting position and size of the bucket metadata for the corresponding bucket in the bucket metadata area.

13. The storage control method according to claim 12, wherein the bucket metadata area includes a page index area and a tag area, and tags of the plurality of key-value pairs are stored in the tag area.

14. The storage control method according to claim 1, during the process of opening the database, further comprising: preloading the metadata segments of the multiple SST files of the database into the memory.

15. The storage control method according to claim 1, before the step of performing the file Input/Output (IO) operation to read the key-value pair, further comprising:
searching key-value pairs for the matching query key in at least one of the memory table and the immutable memory table to obtain the key-value pairs.

16. The storage control method according to claim 15, further comprising:
adding the key-value pairs looked up in at least one of the memory table and the immutable memory table to the result set;
adding the key-value pairs that were read by the file Input/Output (IO) operation to the result set; and
taking the minimum value in the result set as the search result.

17. A data storage device comprising:
a plurality of Solid State Drive (SSD) storage devices, storing a plurality of Sorted String Table (SST) files on the plurality of SSD storage devices;
a processor and memory, wherein, the processor is used to execute instructions to perform the following steps:
using a standardized storage unit to store multiple key-value pairs, in the data segments of the multiple SST files;
 wherein keys of the plurality of key-value pairs comprise a prefix end and a suffix end, and the tags of the plurality of key-value pairs comprise a prefix tag calculated based on the prefix end and a suffix tag calculated based on the suffix end;
establishing a first filter and a second filter, in the metadata segment of the plurality of SST files; obtaining the SST file set matching the query key by using the first filter;
using the second filter to globally sort the matching tags in the SST file set to generate a global tag set, wherein the second filter is a tag filter, comprising tags of the plurality of key-value pairs; and performing tag filtering on the SST files in the SST file set respectively to obtain a matching tag set of the SST files;
selecting SST files based on the global tag set to perform file Input/Output (IO) operations to read key-value pairs; and
globally sorting all matching tags of the SST files in the SST file set according to the suffix tags, wherein, the matching tags in the global tag set are sorted according to the suffix tags in ascending order.

* * * * *